United States Patent [19]

Koetsch et al.

[11] Patent Number: 5,246,317
[45] Date of Patent: Sep. 21, 1993

[54] QUICK-RELEASE ARBOR FOR HOLE SAWS

[75] Inventors: Paul W. Koetsch, Springfield; Robert J. Ecker, Chicopee, both of Mass.

[73] Assignee: American Saw & Mfg. Company, East Longmeadow, Mass.

[21] Appl. No.: 828,702

[22] Filed: Jan. 31, 1992

Related U.S. Application Data

[63] Continuation-in-part of Ser. No. 815,495, Dec. 31, 1991, Pat. No. 5,154,552.

[51] Int. Cl.$^5$ .............................................. B23B 51/04
[52] U.S. Cl. ...................................... 408/204; 408/209
[58] Field of Search ............... 408/204, 206, 209, 703; 144/20, 23

[56] References Cited

U.S. PATENT DOCUMENTS

| | | | |
|---|---|---|---|
| 4,036,560 | 7/1977 | Clark et al. | 408/204 |
| 4,148,593 | 4/1979 | Clark | 408/204 |
| 4,968,189 | 11/1990 | Pidgeon | 408/209 |
| 5,035,548 | 7/1991 | Pidgeon | 408/204 |
| 5,108,235 | 4/1992 | Czyzewski | 408/209 |
| 5,154,552 | 10/1992 | Koetsch | 408/204 |

*Primary Examiner*—Daniel W. Howell
*Attorney, Agent, or Firm*—Chapin, Neal & Dempsey

[57] ABSTRACT

Quick-release arbor for hole saws has a generally cylindrical shaft with a threaded end portion for a screw-fitted connection to the threaded bore of a hole saw. A collar is disposed about the shaft, includes a shank, at one end, adapted for connection to a power driven chuck and, at its other end, a pair of diametrically spaced-apart drive-pins. The collar and shaft are characterized, respectively, by inner and outer diameters which provide a clearance therebetween so that the collar and the shaft are both axially movable and rotatable relative to each other. A retainer carried by the collar and another retainer carrier by the shaft for interengagement with the one retainer. The retainers are disposed for releasably retaining the collar in a retracted position and configured to enable clockwise rotation of the shaft for threading the same to a snug fit within the central bore of the hole saw and, without backing off the snug fit, to enable further rotation of the collar to align the drive pins with the drive holes. Interengagement of the retainers being such that the collar is movable axially relative to the shaft from its retracted to its extended position for manually fitting the pins into the drive holes.

6 Claims, 5 Drawing Sheets

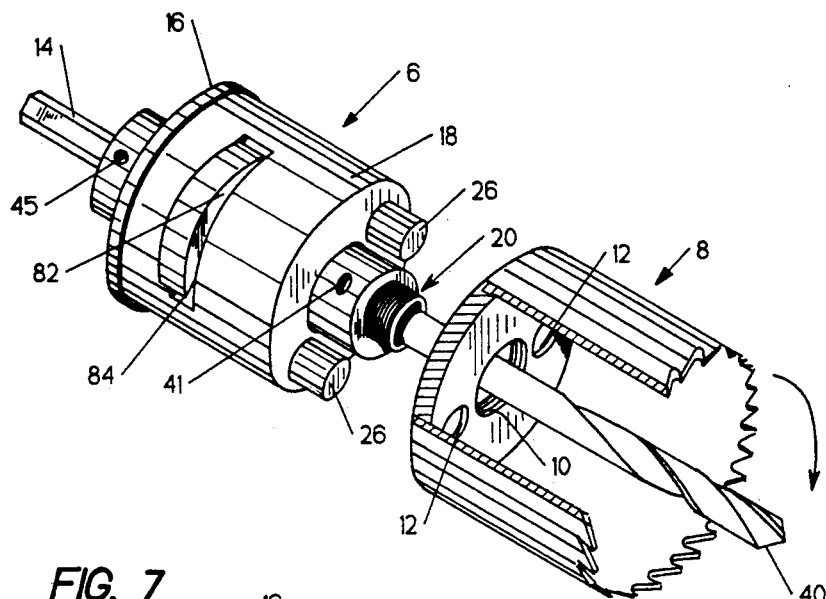
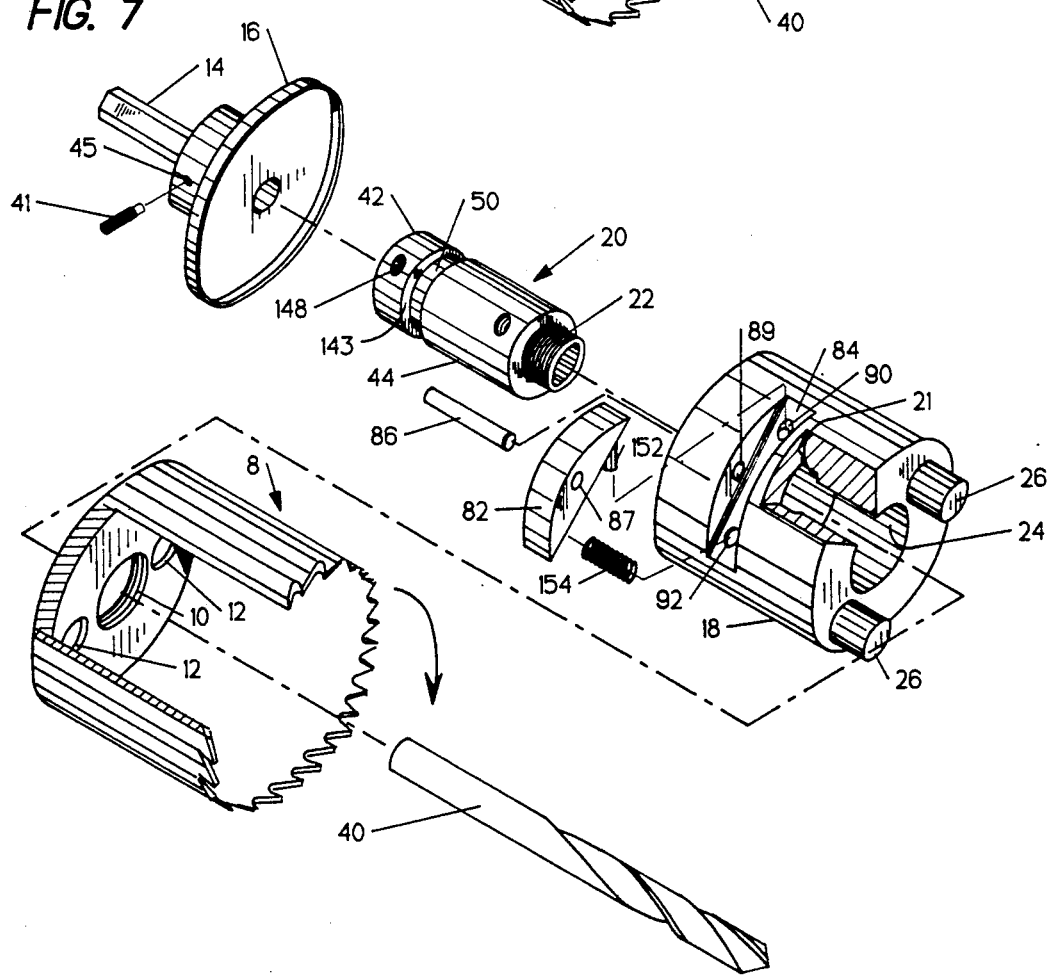

QUICK-RELEASE ARBOR FOR HOLE SAWS

This application is a continuation-in-part of a co-pending application for "QUICK-RELEASE ARBOR FOR HOLE SAWS", Ser. No. 07/815,495, filed on Dec. 31, 1991, now U.S. Pat. No. 5,154,552 in the name of Paul W. Koetsch, one of the joint inventors of this application.

BACKGROUND OF THE INVENTION

This invention relates to hole saw arbors and more particularly to arbors that are adapted for quick attachment to and release from hole saws and which solves the problem of hole saw wobble.

In the prior art there have been numerous disclosures of quick release hole saw arbors, such as U.S. Pat. No. 3,758,221, dated Sep. 11, 1973, assigned to Black & Decker Manufacturing Company. This patent shows a lock plate and fastener nut for attaching the drive shaft to hole saws of various diameters. Other such arbors are disclosed in U.S. Pat. No. 3,784,316, dated Jan. 8, 1974, and U.S. Pat. No. 3,837,759, dated Sep. 24, 1974, both assigned to Capewell Manufacturing Company, as well as U.S. Pat. No. 4,036,560, dated Jul. 19, 1977, and U.S. Pat. No. 4,148,593, dated Apr. 10, 1979, both assigned to Stanadyne, Inc. While these prior patents show various means for connecting and disconnecting drive arbors from a power source to hole saws of various diameters, they do not solve the problem of hole saw wobble resulting from almost always having to "back-off" the threaded connection between the arbor and the hole saw in order to line up the drive pins of the arbor with the drive holes of the hole saw. In this condition, if one holds the drive end of the arbor and shakes the assembly, the hole saw will wobble in a manner suggestive of a "dinner bell", hence called the "dinner bell" effect.

More recently, U.S. Pat. No. 5,035,550, dated Jul. 30, 1991, assigned to House B.M. Co., Ltd., discloses a mechanism for connecting a hole saw to a drive shaft to solve the wobble problem. In that patent, however, the hole saw is not the conventional type, but is specially designed for that purpose. It is open at both ends and includes a bolt 6 adapted to be screw-fitted in a threaded hole within the hole saw body. While this structure would overcome the problem of hole saw wobble, it could not be use for connection to conventional hole saws which, in sizes of 1¼ inch and larger, have a threaded central bore and radially offset drive holes in the base thereof.

The principal object of this invention is to provide a novel arbor construction for quick and easy attachment to and release from conventional hole saws which overcomes the problem of hole saw wobble.

Another object of this invention is to provide an arbor construction of the above type which enables the threaded central member to be snugly screwed by clockwise rotation into the bore of a hole saw and by continued clockwise rotation of a rotatable drive collar to align its drive pins with the drive holes of the hole saw.

The above and other objects and advantages of this invention will be more readily apparent from the following description read in conjunction with the accompanying drawings, in which:

FIG. 6 is a perspective view of an arbor similar to the arbor of FIG. 1, but with a modified retaining mechanism;

FIG. 7 is an exploded perspective view of the arbor of FIG. 6;

Figure 5:
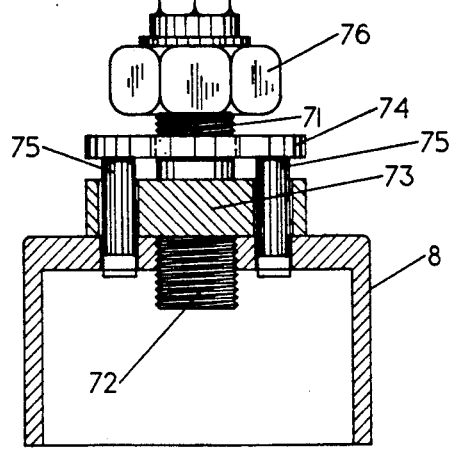
FIG. 5 is an elevational view, partly in section, showing a typical quick-disconnect arbor which is currently the state-of-the-art.

A typical hole saw arbor indicative of the current state-of-the-art, shown in FIG. 5, is releasably connected to conventional hole saws 8 but, as will be more fully described hereinafter, that arbor does not overcome the problem of hole saw wobble.

Figure 1:
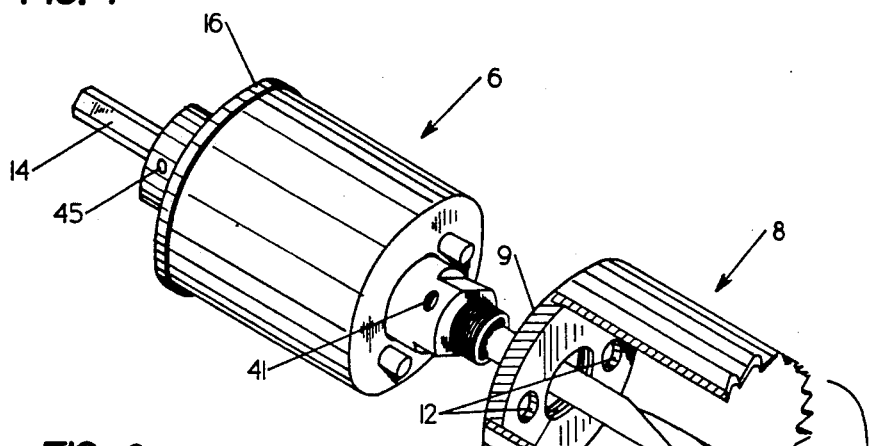
FIG. 1 is a perspective view of an arbor of the type embodying this invention ready to be attached to a hole saw.

Referring now in detail to the drawings, at 6 in FIG. 1, is shown a quick-release arbor of the type embodying this invention ready to be attached to hole saws 8 of conventional construction of 1¼ inch and larger in diameter. Such hole saws include a planar base 9 with a threaded central bore 10 and a pair of drive holes 12 extending therethrough in diametrically spaced relation on opposite sides of the bore 10. In accordance with this invention, the arbor comprises a drive collar 18 (FIG. 2) coaxially disposed about a cylindrical shaft 20 and being axially movable and rotatable relative to the shaft. The shaft has a threaded end portion 22 adapted to be screw-fitted into bore 10 and the collar 18 includes pins 26 adapted to fit into holes 12 of the hole saw.

Figure 2:
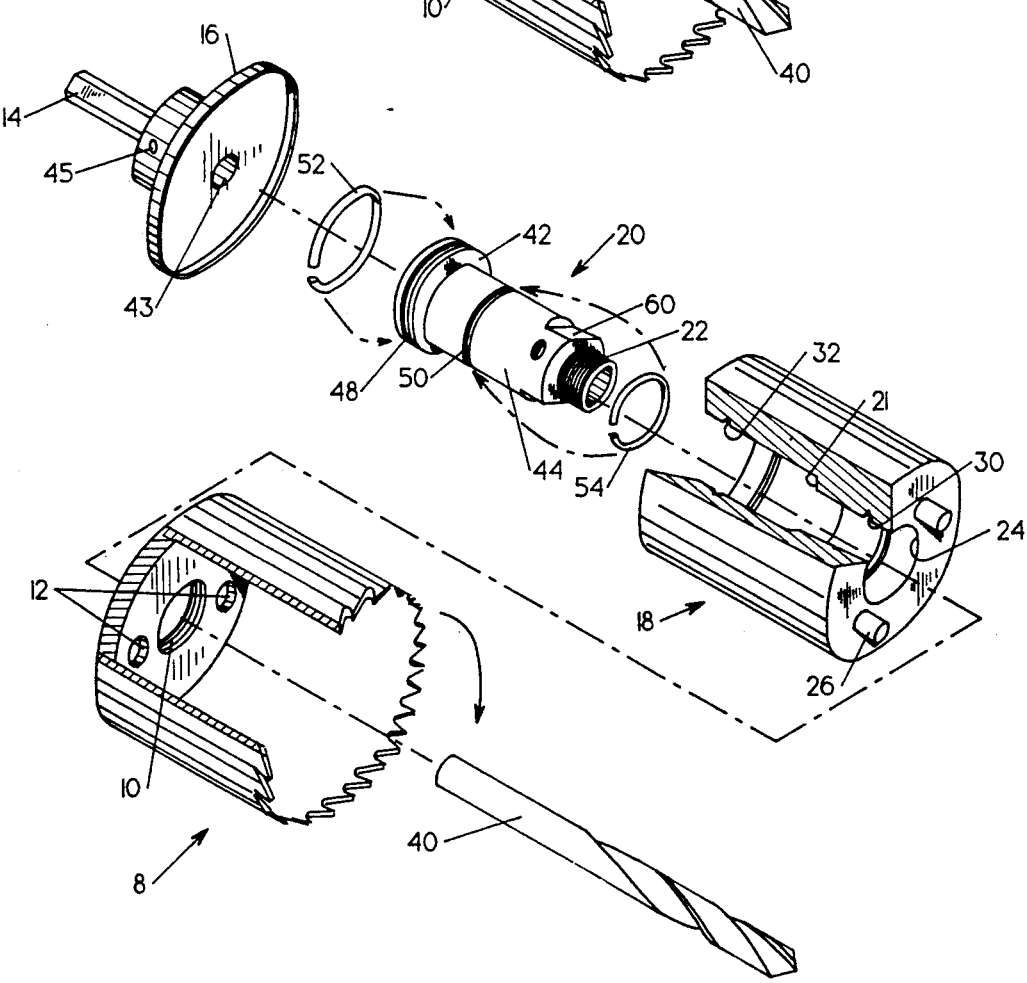
FIG. 2 is an exploded perspective view of the arbor, as shown in FIG. 1.

The collar comprises a tubular shank 14 of polygonal cross-section coaxially extending from a circular cap 16 which may be appropriately secured, such as by threading or welding to the upper end of the collar 18 disposed about the shaft 20 (FIG. 2). The collar is of generally cylindrical tubular construction and is preferably of uniform outer diameter throughout its length and is of stepped inner diameter, the junction of which is provided by annular shoulder 21. The shoulder serves as a limit stop for the outward movement of the shaft 20. As illustrated, the collar 18 is "open" at its upper end to receive the shaft therein before the cap 16 is secured thereto. The threaded end 22 of the shaft 20 is adapted to extend through the opening 24 at the lower end of the collar for screw-fitting into bore 10. Disposed diametrically on opposite sides of the hole 24, are a pair of pins 26 dimensioned to interfit within the holes 12 in the base of the hole saw. The pins 26 may be cylindrical, or may be outwardly tapered, or divergent in cross-section toward their outer ends, to minimize the tendency of the saw to loosen during a cutting operation.

The collar 18 is provided with one or more retainer members, detent members, or portions thereof which, in the embodiment shown, take the form of axially-spaced annular grooves 30 and 32 disposed about the inner circumference of the collar 18. Groove 30 is located on the surface of lesser diameter below the shoulder 21, whereas groove 32 is located on the surface of larger diameter above the shoulder 21.

The shaft 20 is adapted to be fitted within the collar 18 which is also of generally stepped cylindrical cross-section. At its outer end, the shaft 20 includes an externally threaded stem portion 22 adapted to be screw-fitted into the internally threaded central bore 10 of the hole saw 8. The shaft 20 may be tubular, or hollow at is lower end, or throughout its length, to receive the shank end of a pilot-drill 40 which may be secured therein by means of a radially extending set-screw 41. The shank 14 may also be tubular throughout its length, as shown at 43 in FIG. 3, whereby the set-screw may be disposed to extend through the shaft 20, as shown, to secure the pilot-drill in place. Alternatively, by providing longer drill bits, the set-screw may be disposed in a threaded hole 45 through the wall of the shank 14 to lock the drill in place therein. The shaft 20, from one end to the other, is of stepped-diameter having an inner end portion 42, an intermediate body portion 44 and the stem 22 at the outer end thereof.

The outer diameters of shaft 20 and inner diameters of collar 18 are selected so that the shaft will interfit closely within the collar with a free sliding clearance to provide for both the rotation and axial movement of the shaft and collar relative to one another.

The shaft 20 is also provided with one or more retainer, or detent members, or portions thereof which, in the embodiment shown, comprise grooves 48 and 50 in which are disposed respectively, spring ring members 52 and 54 shown in the form of open-ended, annular members spring tensioned when radially or diametrically compressed. In their untensioned condition, the rings have a larger outer diameter than the inner diameter of the collar 18 whereby the outer portions thereof extend within the clearance, or are interposed, between the shaft and the collar. Thus, when the retainers or the spring-rings 52 and 54 are in axial alignment with the retainers or grooves 32 or 30 within the collar 18, the rings will expand outwardly and thus releasably retain the shaft 20 and the collar 18 in fixed axially relation. Nonetheless, in this construction, both the collar and shaft will still be relatively rotatable, as will hereinafter be more fully described. The shaft 20, adjacent its stem portion 22, includes a pair of oppositely disposed flats 60 for engagement by the jaws of a wrench which may, or may not, be necessary to tighten securely the threaded stem 22 of the shaft in the bore 10 of the hole saw.

The prior art hole saw arbor, illustrated in FIG. 5, is shown connected to a hole saw 8 of the same type as described above. The arbor comprises a spindle having a drive shank 70 at its upper end, an intermediate threaded portion 71 and a lower threaded portion 72 to be threaded into the central hole of the arbor saw 8. The spindle also includes a fixed flange 73 disposed between the two threaded portions thereof. An axially movable locking plate 74 has drive pins 75 extending from the lower surface thereof and a lock nut 76 is threaded onto the section 71 of the spindle for securing the pins 75 in driving relation with the drive holes of the hole saw 8. In using this device, the lower threaded portion 72 is first screw-fitted into the central hole of the hole saw until the lower surface of flange 73 abuts the upper surface of the hole saw. It is most unlikely, under the law of probability, that the pins would be aligned with the drive holes of the hole saw. Since the lock plate 74 is not rotatable relative to the spindle, the only way that such alignment can be achieved, is by "backing off" the spindle until the pins are aligned with the drive holes. The lock plate may then be moved axially downward to fit the pins into the drive holes, as depicted. Finally, the nut 76 may be tightened down to secure the arbor and saw in assembled relation.

Figure 3:
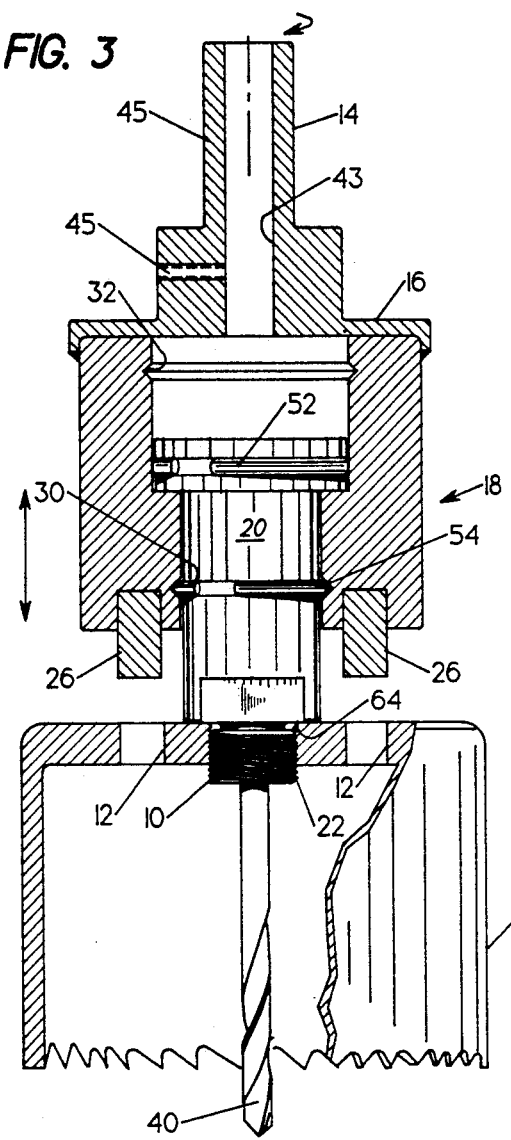
FIG. 3 is a cross-sectional, elevational view of the arbor aligned with and ready for attachment to a hole saw.
Figure 4:
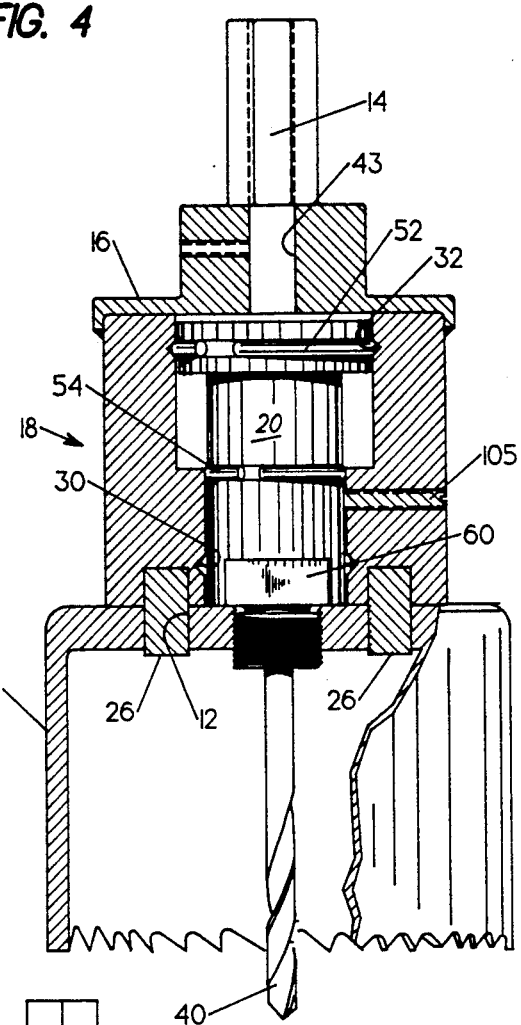
FIG. 4 is a view similar to FIG. 3 in which the hole saw arbor is shown attached to the hole saw.

The quick-release arbor embodying this invention, unlike the prior art devices, is readily attachable to a hole saw 8 in two easy steps, as illustrated in sequence in FIGS. 3 and 4. First, with the collar 18 in its retracted position, as shown in FIG. 3, the externally threaded stem 22 of the shaft may be screw-fitted into the internally threaded bore 10 of the hole saw 8 by rotating the shaft clockwise, in a conventional manner, until the shoulder 64 of the shaft abuts the upper surface of the hole saw. In this way, the two parts are snugly fitted together, either by hand, with the assistance of a wrench, or by wedging the end of a screwdriver between the shaft 20 and a drive pin 26 while screwing the hole saw onto the shaft. With spring ring 54 disposed in groove 30, as shown in FIG. 3, the collar 18 will be retained in its retracted position, but is yet rotatable about the shaft 20. In contrast to the prior art, the next step, regardless of the degree of misalignment of the pins 26 and holes 12, is simply to continue to rotate the collar 18 relative to the shaft until the pins 26, disposed in the lower end surface of the collar, are registered or aligned with the drive holes 12 of the hole saw. The collar 18 may then be readily moved downward or axially with respect to the shaft 20 to its extended position, as in FIG. 4, so that the drive pins are fitted into the drive holes 12 of the hole saw. Significantly, this can be accomplished without first counterrotating or "backing off" the threaded engagement of the shaft 20 and hole saw 8.

In FIG. 4 is shown a set-screw 105 which extends through the wall of the collar 18 so that it may be used to assist in holding the shaft selectively in its retracted or extended positions. A set-screw 105 may be used in the event the spring rings 52 and 54, in certain applications, do not provide adequate retaining force. Thus, by simply tightening down on the set-screw 105, additional frictional forces will be provided for retaining the collar and the shaft in their relative positions. The stem 22 of the shaft can thus be securely screwed into the bore 10 of the hole saw without assistance of a tool and can readily be withdrawn from the work after each cutting operation has been finished.

Referring to FIGS. 6-12, an alternative embodiment of the present invention is shown which comprises the same basic structure and operates in generally the same manner as the first embodiment heretofore described, except that the retainer, or detent members on the collar 18 and shaft 20 have been modified. Specifically, the retainer member of collar 18 comprises a detent pin 152 disposed adjacent one end of a lever arm 82. The lever arm 82 is pivotable at approximately its center about pin 86 which is fitted into holes 87 and 89 in the arm 82 and the collar 18, respectively. The pin 152 is urged radially inward into engagement with the shaft 20 by a coil spring 154 disposed on the opposite end of the lever arm 82.

The collar 18 is provided with a segmental shaped cutout 84 adapted to receive therein the lever arm 82 which preferably has a configuration that is complementary to the shape of the cutout 84. A hole 90 adjacent one end of the cutout 84 is provided through the wall of the collar and a depression, or seat 92 for one end of the spring 154 is provided adjacent the opposite end of the cutout 84. A similar seat 93 (FIG. 8) is provided in the opposed inner surface of the lever 82. The lever 82 is urged by the spring 154 in a counterclockwise direction so that the free-end of the pin 152 will engage the outer surface of the shaft 20.

Figure 11:
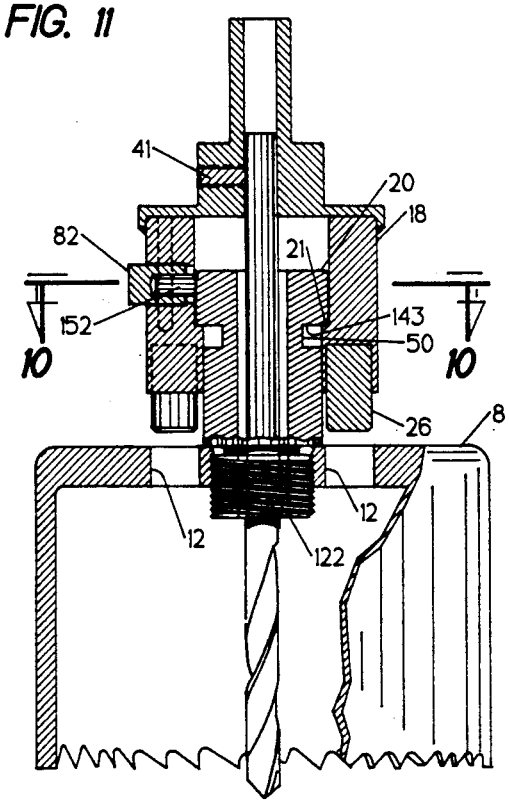
FIG. 11 is a cross-sectional view taken along line 11—11 of FIG. 10 showing the drive pins in alignment with the drive holes ready for attachment.
Figure 12:
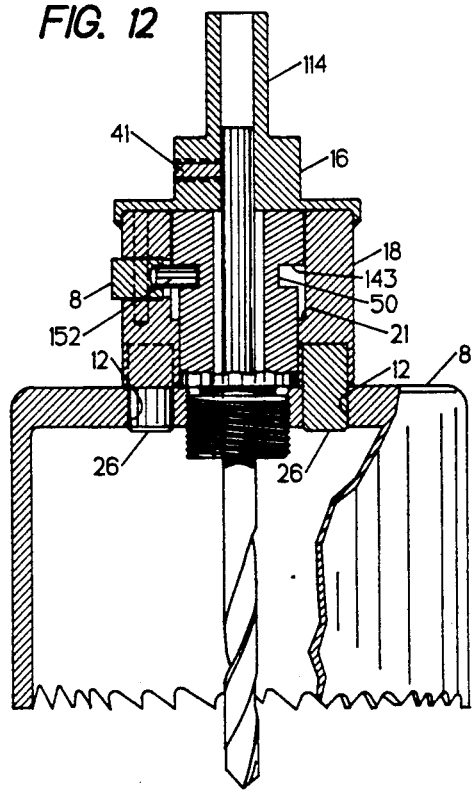
FIG. 12 is a cross-sectional view taken along line 12—12 of FIG. 10 showing the drive collar in its extended position with its pins in driving engagement with the hole saw.

For releasable interengagement with the detent pin 152, shaft 20 is provided with a recess 148 adjacent its upper end and an annular groove 150 axially therefrom a distance equal to the stroke length of the collar from its retracted to its extended position, as shown respectively in FIGS. 11 and 12. The recess 148, shaped and dimensioned to receive the free-end of pin 152, is located on the end portion 142 of larger outside diameter, while the groove 50 is located on the intermediate portion 44 of smaller diameter. The recess 148, disposed above the shoulder 143 approximately the same distance that the hole 90 through the wall of the collar 18, is located above shoulder 21. Thus, when the collar 18 is in its retracted position, (FIG. 9) the pin 152 and the recess 148 will be at the same height, or axial position, so that whenever, by relative rotation of the collar and shaft, the pin 152 and recess 148 are brought to the same angular orientation, the pin 152 being urged inwardly by spring 154 will snap into recess 148. As a result, the shaft 20 and the collar 18 will be releasably retained in the same axial and angular relationship until the pin 152 is withdrawn from the recess 148. In that fixed disposition, clockwise rotation of the collar 18 will enable the threaded stem portion 22 of the shaft 20 to be screw-fastened entirely by hand into the bore 10 of the hole saw until the shoulder 64 of the shaft (FIG. 9) is firmly seated against the upper surface of the hole saw 8.

Figure 8:
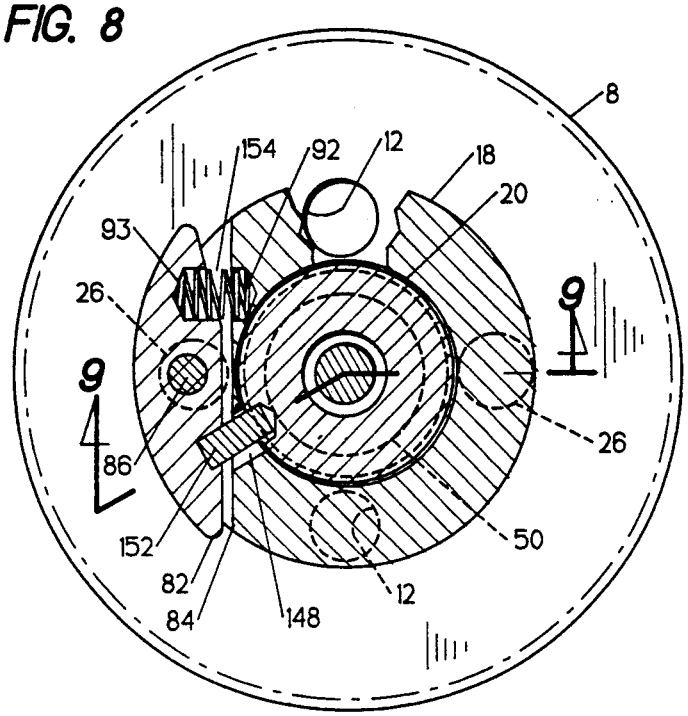
FIG. 8 is a cross-sectional view taken along line 8—8 of FIG. 9.
Figure 9:
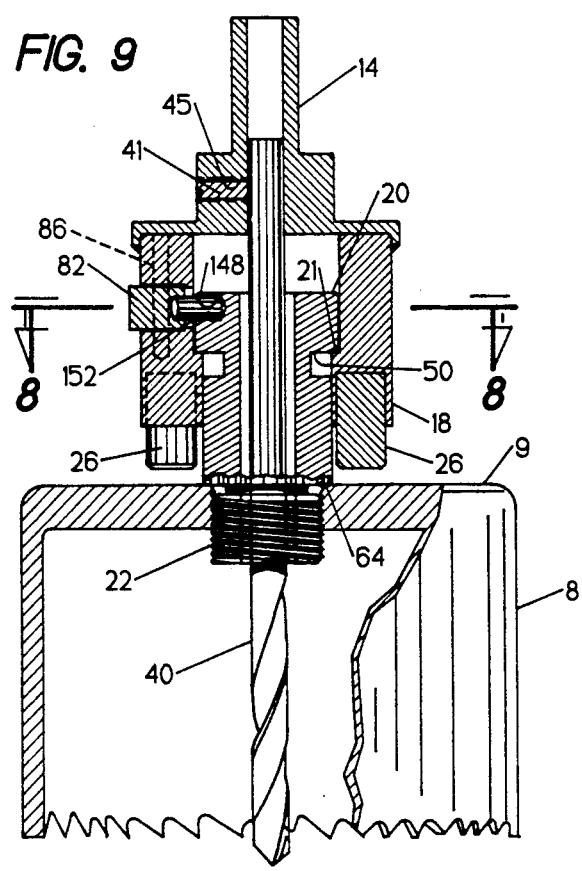
FIG. 9 is a cross-sectional view taken along line 9—9 of FIG. 8 and showing the arbor drive collar in its retracted position, as in FIG. 3, but with the drive pins misaligned with the drive holes of the hole saw.
Figure 10:
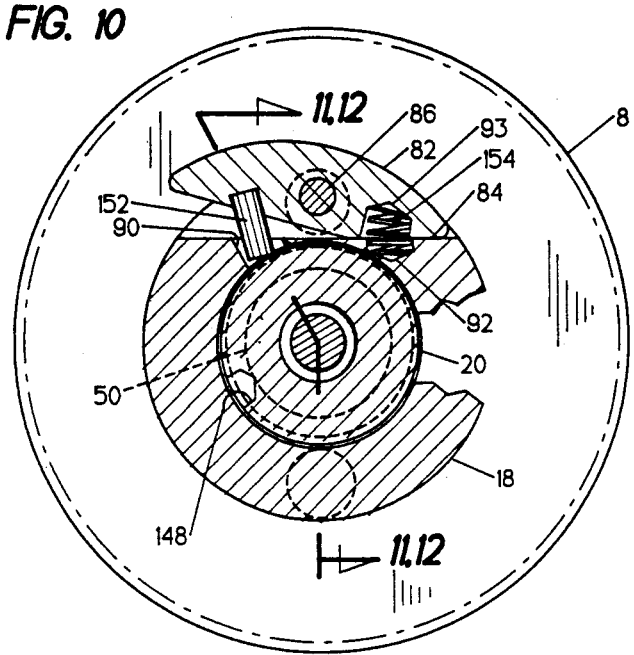
FIG. 10 is a cross-sectional view taken along line 10—10 of FIG. 11 showing the drive collar of the arbor rotated to a position in which its drive pins are aligned with the holes of the hole saw.

In FIGS. 8 and 9 of the drawings, the shaft 20 is shown as having been screw-fitted snugly into the hole saw with the pin 152 disposed in the recess 148 of the shaft. Invariably, the drive holes 12 of the hole saw will not line up or register with the drive pins 26 the collar 18 and, by way of illustration only, the holes 12 are shown in FIG. 8 as angularly offset from the drive pins 26 by about 90°. In accordance with this invention, continued clockwise rotation of the collar 18, as illustrated by the arrow in FIG. 8, will enable the pins 26 to be brought into alignment with the holes 12 of the hole saw. This can be accomplished by manually depressing the leading end of the lever 82 where the spring 154 is located whereby the pin 152 will be withdrawn by lever 82 from the recess 148. This frees the collar 18 for clockwise rotation relative to the shaft until the pins 26 are registered with the drive holes 12 of the hole saw, as depicted in FIGS. 10 and 11. The pin 152 may also be withdrawn from recess 148 without the use of the lever by exerting sufficient clockwise torque on the collar 18 whereby the pin will be moved radially outward by a component of force exerted on the pin which will cause spring 154 to be compressed whereby the pin 152 will be automatically ejected from the recess 148. In either case, after the collar 18 is rotated to align the drive pins 26 with the drive holes 12, the collar may then be moved axially with respect to the shaft 20 to its extended position (FIG. 12). This axial movement, as illustrated in FIGS. 11 and 12, will result in the pin 152 being snap-fitted into the annular groove 150, regardless of its angular orientation when the alignment step has been completed. Further, this can be accomplished, as previously described, without "backing off" the screw-fitted engagement of the shaft and the hole saw so that there will be no wobble at the connection of the hole saw to the shaft during cutting operations, as had heretofore been customary with such tools.

By connecting the drive chuck of a rotatable power source (not shown) to shank 14 of either of the above-described embodiments, the hole saw 8 will be driven solely by the drive pins of the collar while the shaft, per se, is not driven by the arbor, but is carried by the hole saw. After a cutting operation has been completed, the hole saw can be detached from the arbor by simply axially shifting the collar to its retracted position, as depicted in FIGS. 3 and 9, and then unscrewing the threaded stem portion of the shaft from the hole saw. It will be realized, moreover, that the threaded connection between the shaft and hole saw will not be perceptibly tighter after drilling than beforehand, since the hole saw 8 will have been driven by the drive pins of the arbor and not by the threaded portion of the shaft.

Having thus described my invention, what is claimed is:

1. In an arbor for releasable attachment to a hole saw including a base with a threaded central bore and drive holes spaced outwardly of the bore and having a cylindrical shaft with a threaded end portion for connection to said central bore and adapted to receive therein a pilot-drill bit, a collar having, at one end thereof, a shank adapted for connection to a drive chuck and, at its other end, depending drive pins and having a retracted position with the pins clear of said drive holes and an extended position in which said pins are engaged with said drive holes, the improvement comprising the collar and shaft having inner and outer diameters dimensioned respectively to provide peripheral clearance therebetween so that the collar and shaft are both axially movable and rotatable relative to each other, a spring urged detent pin carried by the collar, a recess and an annular groove axially-spaced apart on the shaft and engageable with the pin to releasably retain collar in its retracted and extended positions.

2. In an arbor for releasable attachment to a hole saw, as set forth in claim 1, in which the recess is adapted to receive therein the detent pin when the collar is in its retracted position to thereby retain the collar and shaft in fixed relation, said groove being adapted to receive therein the pin regardless of angular orientation to thereby retain the collar in its extended position relative to the shaft.

3. In an arbor for releasable attachment to a hole saw, as set forth in claim 2, in which said detent pin is carried on one end of a pivotable lever and the spring is disposed on the opposite end of said lever, said pin extending through a radial opening in the collar adapted to register with the recess in the shaft when the collar is in its retracted position, said groove being spaced axially from said recess a distance such that when the collar is moved to its extended position, the pin, urged by said spring, will snap-fit into said groove to releasably retain said collar in its extended position relative to the shaft.

4. In an arbor for releasable attachment to a hole saw, as set forth in claim 3, in which said recess in the shaft is adapted to receive the inner end of said pin to releasably retain the shaft and collar in fixed relation, the axes of said pin and recess being radially oriented relative to the shaft.

5. In an arbor for releasable attachment to a hole saw, as set forth in claim 4, in which said lever arm is pivotable at a point intermediate said pin and coil spring in which the pin is adjacent the trailing end of the lever in drive direction of the arbor and the spring is at the leading end of the lever whereby, when a sufficient torque is applied in attempting to rotate the collar clockwise relative to the shaft after the shaft has been firmly seated on a hole saw, a component of force will cause the pin to thrust outwardly of the recess whereby the collar is free to be rotated and moved axially to its extended position.

6. In an arbor for releasable attachment to a hole saw including a base with a threaded central bore and drive holes spaced outwardly of the bore and having a cylindrical shaft with a threaded end portion for connection to said central bore and adapted to receive therein a pilot-drill bit, a collar having, at one end thereof, a shank adapted for connection to a drive chuck and, at its other end, depending drive pins and having a retracted position with the pins clear of said drive holes and an extended position in which said pins are engaged with said drive holes, the improvement comprising the collar and shaft having inner and outer diameters dimensioned respectively to provide peripheral clearance therebetween so that the collar and shaft are both axially movable and rotatable relative to each other and a retainer comprising a set-screw carried by the collar and engageable with the shaft to selectively retain the collar in its retracted and extended positions.

* * * * *